US008830858B2

(12) United States Patent
Macias et al.

(10) Patent No.: US 8,830,858 B2
(45) Date of Patent: Sep. 9, 2014

(54) UTILIZING SCANNED RADIO ACCESS TECHNOLOGY INFORMATION

(75) Inventors: John F. Macias, Antelope, CA (US); Lalit R. Kotecha, San Ramon, CA (US); Patricia R. Chang, San Ramon, CA (US); David Chiang, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 78 days.

(21) Appl. No.: 13/435,873

(22) Filed: Mar. 30, 2012

(65) Prior Publication Data

US 2013/0258870 A1  Oct. 3, 2013

(51) Int. Cl.
*H04L 1/00* (2006.01)
*H04W 4/00* (2009.01)

(52) U.S. Cl.
USPC .......................... 370/252; 370/332; 370/338

(58) Field of Classification Search
CPC ......... H04J 3/14; H04W 24/00; H04W 36/30; H04W 36/24; H04W 84/12; H04W 80/04; H04W 84/18; H04W 88/06; H04L 43/50; H04L 43/0852; H04L 43/08; H04B 17/003; H04B 7/2628; H04B 2201/70701; H04B 2201/70718

USPC ................... 370/241, 252, 332, 333, 335, 338
See application file for complete search history.

(56) References Cited

U.S. PATENT DOCUMENTS

| 8,295,838 | B2* | 10/2012 | Abdel-Kader et al. | ........ 455/436 |
| 8,503,430 | B2* | 8/2013 | Shahidi et al. | ................ 370/352 |
| 2007/0032235 | A1* | 2/2007 | Wahl et al. | ................. 455/435.2 |
| 2009/0088159 | A1* | 4/2009 | Wu et al. | ........................ 455/436 |
| 2010/0208694 | A1* | 8/2010 | Kumai et al. | ................. 370/331 |
| 2012/0076119 | A1* | 3/2012 | Li | ................................ 370/338 |

* cited by examiner

*Primary Examiner* — Xavier Szewai Wong
*Assistant Examiner* — Natali N Pascual Peguero

(57) ABSTRACT

A method may include monitoring available radio access networks for information on one or more of types of radio access technologies, measurements of signal quality, measurements of signal strengths, or carrier identifiers of the available radio access networks; calculating network priorities for the available radio access networks based on the monitored information; detecting a border condition, the border condition based on a decrease in the measurements of signal quality or the measurements of signal strength; selecting, when a border condition is detected, a new radio access network from the available radio access networks based on the calculated network priorities of the available radio access networks; and connecting to a communication channel using the selected available radio access network.

20 Claims, 6 Drawing Sheets

| RAN 410 | QUALITY ASSESSMENT 420 | SIGNAL STRENGTH 430 | CARRIER INFORMATION 440 | NETWORK PRIORITY 450 |
|---|---|---|---|---|
| LTE-1 | 3 | 2 | 3 | 1 |
| LTE-2 | 2 | 3 | 2 | 2 |
| LTE-3 | 1 | 1 | 1 | 3 |
| HRPD-1 | 3 | 2 | 3 | 4 |
| HRPD-2 | 1 | 2 | 2 | 5 |
| GSM-1 | 3 | 2 | 3 | 6 |
| GSM-2 | 3 | 2 | 2 | 7 |
| GSM-3 | 1 | 1 | 1 | 8 |
| WIFI-1 | 3 | 2 | 1 | 9 |
| WIFI-2 | 1 | 1 | 1 | 10 |

FIG. 4

UTILIZING SCANNED RADIO ACCESS TECHNOLOGY INFORMATION

BACKGROUND

Data can be carried on one of a variety of mobile Radio Access Technologies (RATs) capable of providing a data connection with a mobile device. Example RATs can include Long Term Evolution (LTE) technology, High Rate Packet Data (HRPD) technology (including evolved High Rate Packet Data (eHRPD) technology), Global System for Mobile Communications (GSM) technology, and IEEE 802.11 Wireless Fidelity (WiFi) access technology.

Mobile devices can be required to change RATs if the mobile devices change coverage areas, which can impact the mobile devices' connections to the Internet. Handoffs between RATs can have issues when the RATs do not have an agreement to handoff the mobile device from one RAT to another RAT. These handoffs can cause the mobile device to temporarily disconnect from all RATs, which can diminish a user's experience. Additionally, these handoffs can be delayed, which can cause further diminishing effects on the user's experience. For example, connecting to the new RAT can be delayed as the mobile device scans for available RATs.

BRIEF DESCRIPTION OF THE DRAWINGS

FIG. 4 is a data structure according to an implementation described herein;

DETAILED DESCRIPTION OF PREFERRED EMBODIMENTS

The following detailed description refers to the accompanying drawings. The same reference numbers in different drawings may identify the same or similar elements.

Systems and/or methods, as described herein, may provide a mobile device with the ability to change a first connection using a Radio Access Technology (RAT) to a second connection using a different RAT that reduces the delay in establishing the second connection. In one implementation, a Most Recently Scanned RAT (MRSRAT) list can be created and stored on the mobile device. The MRSRAT list can be used to allow the mobile device to quickly select a new Radio Access Network (RAN), which may implement the same or different RAT, and establish a new session or continue the previous session, if the mobile device disconnects from a previous RAN or experiences signal degradation from the previous RAN. For example, a mobile device connected to a first RAN, such as an LTE network, can lose or experience degradation of the connection with the first RAN. The mobile device can connect to a second RAN, such as another LTE network or a GSM network, on the list without the mobile device having to scan for other available RAT networks, such as LTE networks, HRPD networks, GSM networks, or WiFi networks, prior to connecting to the second RAN.

Mobile devices, such as smart phones, may include logic to connect to a data network, such as the Internet, using one or more of the RATs. The mobile devices may use a particular RAT that is available by choosing the particular RAT from a list of available RATs.

The mobile device described herein may include circuitry for using multiple different RATs, such as LTE, HRPD, GSM, or WiFi. For example, the mobile device can include a chipset that can connect to one or more of LTE, HRPD, GSM, or WiFi technologies.

In one implementation, the mobile device can scan for an available RAN (and the underlying RAT), make a quality assessment of each available RAN, and measure the signal strength of each available RAN. Based on the quality assessment and the signal strength, the mobile device can select a new RAN from a list of available RANs.

Figure 1:
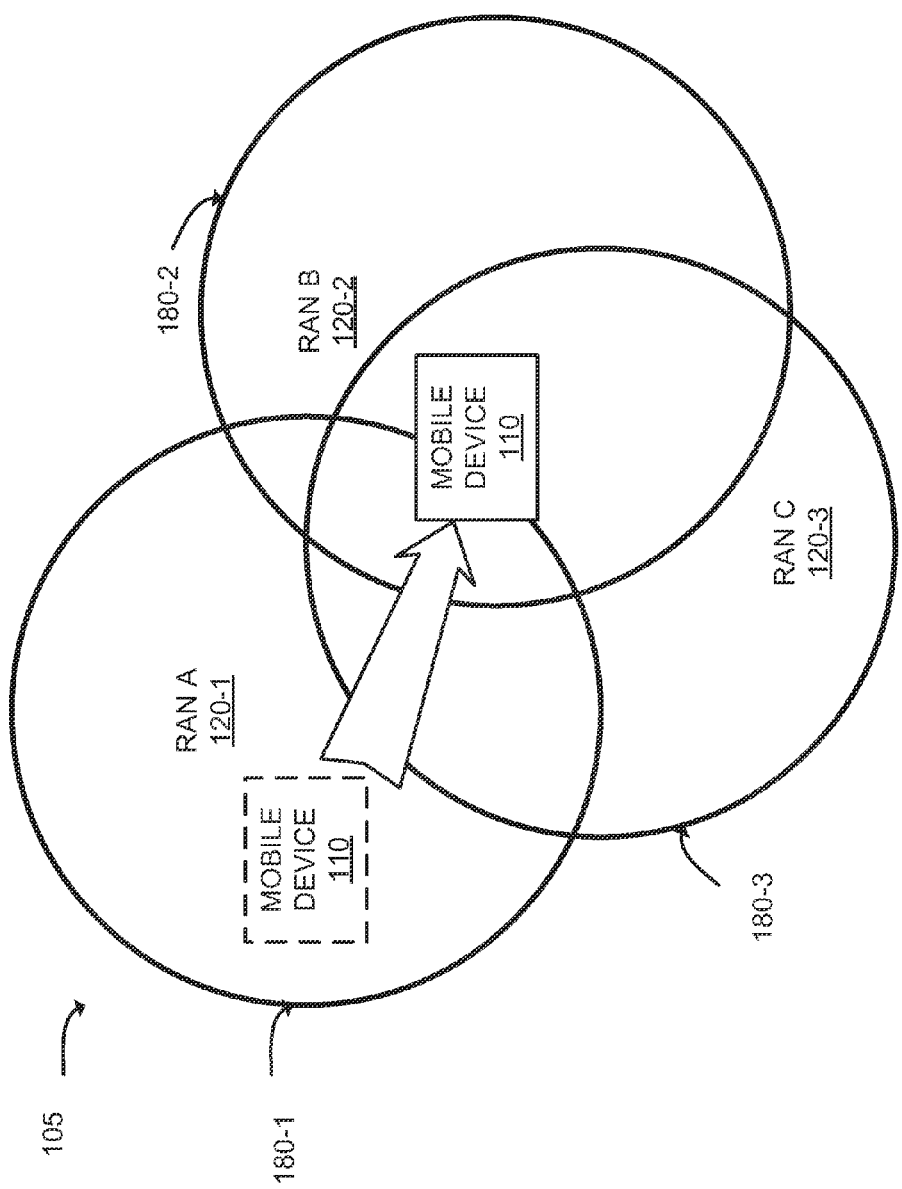
FIG. 1 is a diagram of an overview of an implementation described herein.

FIG. 1 is a diagram illustrating an example environment 105 in which systems and/or methods, as described herein, may be implemented. As shown in FIG. 1, example environment 105 can include mobile device 110 and available RANs 120 (e.g., RAN A 120-1, RAN B 120-2, and RAN C 120-3).

In one implementation, as illustrated in FIG. 1, mobile device 110 can be connected to RAN A 120-1, which uses RAT A. At some later time, mobile device 110 can move to an outer portion of RAN A 120-1 coverage region 180-1, such that mobile device 110 experiences a border condition (e.g., reduction in quality of signal, signal strength, etc.) with respect to mobile device 110's connection to RAN A 120-1. Mobile device 110 can, at the outer portion of RAN A 120-1, also be located within RAN B 120-2 coverage region 180-2 and RAN C 120-3 coverage region 180-3.

Mobile device 110 can change networks from RAN A 120-1 to RAN B 120-2 or RAN C 120-3 with little to no delay in connection if RAN B 120-2 or RAN C 120-3 is known to mobile device 110. Mobile device 110 can rapidly choose between RAN B 120-2 or RAN C 120-3 based on a network priority without scanning to find and then prioritizing the list of available RANs. Additionally, or alternatively, mobile device 110 may be able to switch from RAN A 120-1 to RAN B 120-2 or RAN C 120-3 shortly after a border condition is first noticed, if the network priority is calculated and waiting before the border condition is first noticed by mobile device 110.

Although FIG. 1 shows example components of environment 105, in other implementations, environment 105 may contain fewer components, different components, differently arranged components, and/or additional components than those depicted in FIG. 1. Alternatively, or additionally, one or more components of environment 105 may perform one or more other tasks described as being performed by one or more other components of environment 105.

Figure 2:
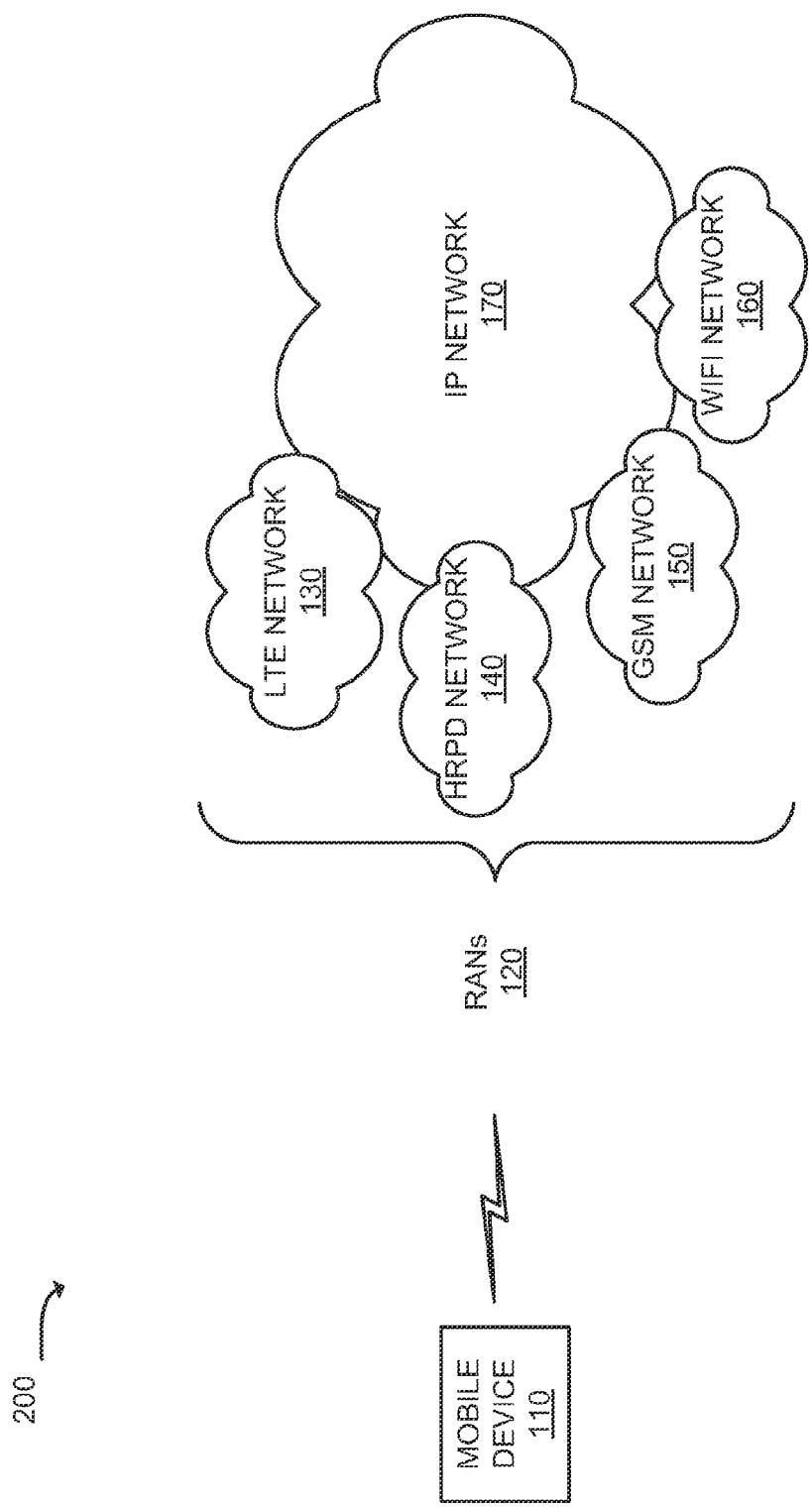
FIG. 2 is a diagram illustrating an example environment in which systems or methods, described herein, may be implemented.

FIG. 2 is a diagram illustrating an example environment 200 in which systems or methods, described herein, may be implemented. As shown in FIG. 2, example environment 200 can include mobile device 110, a group of RANs 120, which can include LTE network 130, HRPD network 140, GSM network 150, and WiFi network 160, and IP network 170. In one implementation, mobile device 110 can connect to IP network 170 using one or more RANs 120.

Mobile device 110 may include portable computing and communication devices, such as a personal digital assistant (PDA), a smart phone, a cellular phone, a tablet computer, a laptop computer with integrated connectivity to a cellular wireless network, etc. Mobile device 110 may include a communication interface with multiple different transceiver circuits using multiple different types of RATs.

Mobile device 110 may connect to IP network 170. RANs 120 may be used to connect mobile device 110 to IP network 170. Mobile device 110 may include logic to connect to different RANs 120 sequentially or simultaneously. For example, mobile device 110 may concurrently connect to both LTE network 130 and HRPD network 140.

RANs 120 may provide access for mobile devices 110 to IP network 170. RANs 120 may be implemented using a number of different devices that receive voice or data and transmit that voice or data to mobile device 110. These devices may also receive voice or data transmitted from mobile device 110.

In one implementation, RANs 120 may include one or more of LTE network 130, HRPD network 140, GSM network 150, and/or WiFi network 160. In other implementations, RANs 120 may also include other 2 G, 3 G, or 4 G networks, and may include 5 G networks or other networks capable of transmitting voice and data.

LTE network 130 may include a network that provides communications between mobile device 110 and Internet Protocol (IP) network 170 using Digital Signal Processing (DSP) techniques and modulations. LTE network 130 can use LTE and/or LTE Advance standards. LTE network 130 can also be called a fourth generation (4 G) cellular network or an evolved universal terrestrial radio access network (E-UTRAN). 4 G networks can include, in addition to or as alternative to an LTE network, other radio access networks, such as an enhanced high rate packet data (eHRPD) network, or a wireless core network (e.g., referred to as an evolved packet core (EPC) network). As used herein, LTE network 130 includes networks that use LTE or LTE Advance standards, and 4 G networks including eHRPD networks and wireless core networks.

HRPD network 140, which can also be called Evolution-Data Optimized (EV-DO), may include a network that provides communications between mobile device 110 and IP network 170 using multiplexing techniques that can include Code Division Multiple Access (CDMA) and Time Division Multiplexing (TDM). HRPD network 140 can also be called a third generation (3 G) cellular network.

GSM network 150 may include a network that provides communications between mobile device 110 and IP network 170 using packet data transport over second generation (2 G) cellular networks.

WiFi network 160 may include a network that provides communications between mobile device 110 and IP network 170 using IEEE 802.11 standards. WiFi network 160 can also be called a Wireless Local Area Network (WLAN).

IP network 170 may include public or private (or both) IP network(s). IP network 170 may, for example, be a packet-based wide area network. IP network 170 may be used to implement telecommunication services, such as through the IP Multimedia Services (IMS) architecture. In some implementations, IP network 170 may connect to additional networks. For instance, IP network 170 may include or connect to a private network and a public network, such as the Internet.

Although FIG. 2 shows example components of environment 200, in other implementations, environment 200 may contain fewer networks, different networks, differently arranged networks, additional networks, fewer components, different components, differently arranged components, and/or additional components than those depicted in FIG. 2. Alternatively, or additionally, one or more components of environment 200 may perform one or more tasks described as being performed by one or more other components of environment 200.

Figure 3:
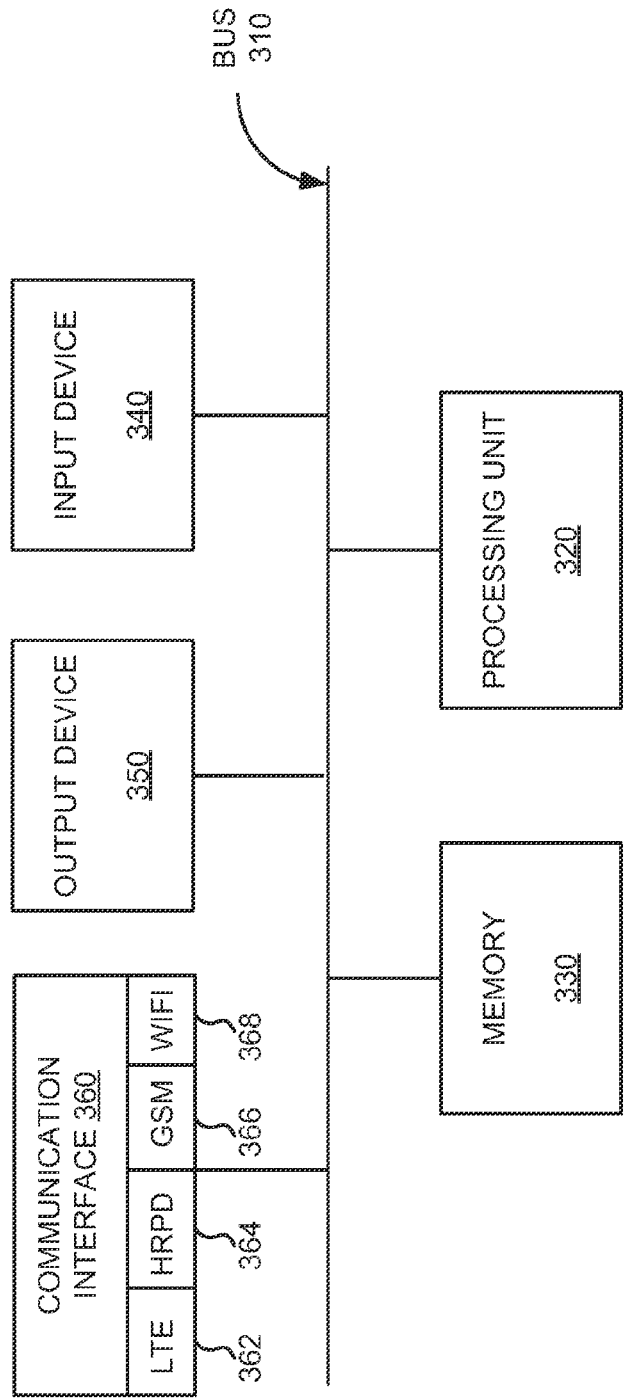
FIG. 3 is a diagram of example components of one or more of the devices of FIG. 2.

FIG. 3 is a diagram of example components of mobile device 110. LTE network 130, HRPD network 140, GSM network 150, WiFi network 160, and IP network 170 may include devices that include similar components. As illustrated, mobile device 110 may include a bus 310, a processing unit 320, a memory 330, an input device 340, an output device 350, and a communication interface 360.

Bus 310 may permit communication among the components of mobile device 110. Processing unit 320 may include one or more processors or microprocessors that interpret and execute instructions. Additionally or alternatively, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for processing unit 320, and/or some other type of magnetic or optical recording medium and its corresponding drive for storing information and/or instructions.

Input device 340 may include a device that permits an operator to input information to mobile device 110, such as a keyboard, a keypad, a mouse, a pen, a microphone, camera, one or more biometric mechanisms, and the like. Output device 350 may include a device that outputs information to the operator, such as a display, a speaker, etc.

Communication interface 360 may include any transceiver-like mechanism that enables mobile device 110 to communicate with other devices and/or systems. For example, communication interface 360 may include mechanisms for communicating with other devices.

In one implementation, in which communication interface 360 is included as part of mobile device 110, communication interface 360 may include logic for communicating using various RATs. In FIG. 3, LTE component 362, HRPD component 364, GSM component 366, and WiFi component 368 are illustrated as being part of communication interface 360. These components may include circuitry, such as components to implement one or more transceivers, for wirelessly connecting to one or more of LTE network 130, HRPD network 140, GSM network 150, or WiFi network 160. In some implementations, components 362, 364, 366, and 368 may be combined or may share portions of the same transceiver circuitry. For example, HRPD component 364 and GSM component 366 may share portions of or all of the antenna and other circuitry needed to connect to a HRPD/GSM network.

As described herein, mobile device 110 may perform certain operations based on processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of mobile device 110, in other implementations, mobile device 110 may contain fewer components, different components, differently arranged components, or additional components than depicted in FIG. 3. Alternatively, or additionally, one or more components of mobile device 110 may perform one or more tasks described as being performed by one or more other components of mobile device 110.

FIG. 4 is a diagram of an example data structure 400 that stores information used to prioritize available RANs 120 for selection by mobile device 110. In one example implementation, data structure 400 can contain a MRSRAT list to allow mobile device 110 to establish a new session or continue a previous session on a new RAN 120, if mobile device 110 experiences signal degradation or disconnection from a previous RAN 120.

In one example implementation, mobile device 110 may store data structure 400 (e.g., in memory 330). Alternatively, or additionally, data structure 400 may be stored in a memory, associated with another device or a group of devices, separate from or in combination with memory 330. Data structure 400 may be stored by mobile device 110 as, for example, a file, as part of a database, a table in memory, etc.

Data structure 400 may include a collection of fields, such as a RAN field 410, a quality assessment field 420, a signal strength field 430, a carrier information field 440, and a network priority field 450. Although FIG. 4 shows example fields 410-450, in other implementations, data structure 400 may include fewer fields, different fields, additional fields, and/or differently arranged fields than depicted in FIG. 4. Additionally, or alternatively, one or more fields of data structure 400 may include information described as being included in one or more other fields of data structure 400.

RAN field 410 may store a RAN 120 network identifier that corresponds to a scanned and available RAN 120. In one example implementation, the network identifier can include information that corresponds to a particular type of RAT. The particular types of RATs may include, for example, LTE, HRPD, GSM, or WiFi technologies. Each network identifier may be used in determining the network priority.

Quality assessment field 420 may store a quality assessment value that corresponds to the quality of a signal of an available RAN 120 found in a scan. Example quality assessment values can include integer values, as illustrated in FIG. 4, corresponding to the quality of the signal (e.g., 3=high, 2=medium, 1=low). The quality of the signal can be correlated between integer values and ranges of quality measurements. For example, a signal-to-noise ratio can be measured for an available RAN, and the value of the measured ratio can be compared to particular ranges corresponding to high, medium, and low. Each quality assessment value may correspond to a factor for determining the network priority.

Signal strength field 430 may store a signal strength value corresponding to the signal strength of the signal received by mobile device 110 for an available RAN 120 found in a scan. Example signal strength values can include measurements of signal strength in decibels of measured power referenced to one milliwatt (dBm) or integer values, as illustrated in FIG. 4, corresponding to the strength of the signal (e.g., 3=high, 2=medium, 1=low). Each signal strength value may be used in determining the network priority.

Carrier information field 440 may store a particular carrier identifier that identifies an owner of a transmitter and/or a service provider. Example carrier identifier values can include integer values, as illustrated in FIG. 4, corresponding to the type of carrier (e.g., 3=the same carrier as the carrier for mobile device 110, 2=a carrier with roaming agreements with the carrier for mobile device 110, 1=a carrier without roaming agreements with the carrier for mobile device 110). Each carrier identifier may be used in determining the network priority.

Network priority field 450 may store a priority identifier that corresponds to a particular priority order for available RANs 120. Each priority identifier may correspond to mobile device 110's network priority for connection when changing connections between RANs 120. For example, mobile device 110 can lose a connection with one particular RAN 120, and mobile device 110 can connect to another particular RAN 120 with the highest priority identifier in RAN field 410.

The RAT types of RANs 120 and number of RANs 120 in RAN field 410 can vary based upon the location of mobile device 110, the scanning, connecting, and communicating capabilities of mobile device 110, the strengths of signals for transmitters around mobile device 110, etc. For example, locations may have access to multiple RANs 120 using LTE networks 130, HRPD networks 140, GSM networks 150, and WiFi networks 160.

Data structure 400 may include information identifying available RANs 120 that can be found by scanning by mobile device 110. Mobile device 110 may gather information for data structure 400, including the RAN network identifiers of available RANs 120 for field 410, the quality assessment values for field 420, the signal strength value for field 430, and/or the carrier identifier for field 440, by scanning during active sessions (e.g., mobile device 110 is concurrently being used during scanning) or idle sessions (e.g., mobile device 110 is not concurrently being used during scanning).

In one implementation, scanning for available RANs 120 can occur while mobile device 110 is active (e.g., mobile device 110 is in use). Scanning during an active session can occur if mobile device 110 has at least two channels. In one implementation, mobile device 110 can include two channels, a first channel that can conduct a data session with IP network 170 via a connected RAN 120, and a second channel that can scan for available RANs 120. Additionally, or alternatively, scanning for available RANs 120 can occur while mobile device 110 is idle (e.g., the first channel is not being used).

In one implementation, mobile device 110 can scan for available RANs 120, while idle, on a cycle or when there is a change in network conditions experienced by mobile device 110 (e.g., mobile device 110 experiences a border condition). For example, a slot cycle can be scheduled to occur regularly, such as every 5, 10, 15, or 20 seconds while mobile device 110 is active, or every 1, 2, 3, 4, or 5 minutes while mobile device 110 is idle.

Figure 5:
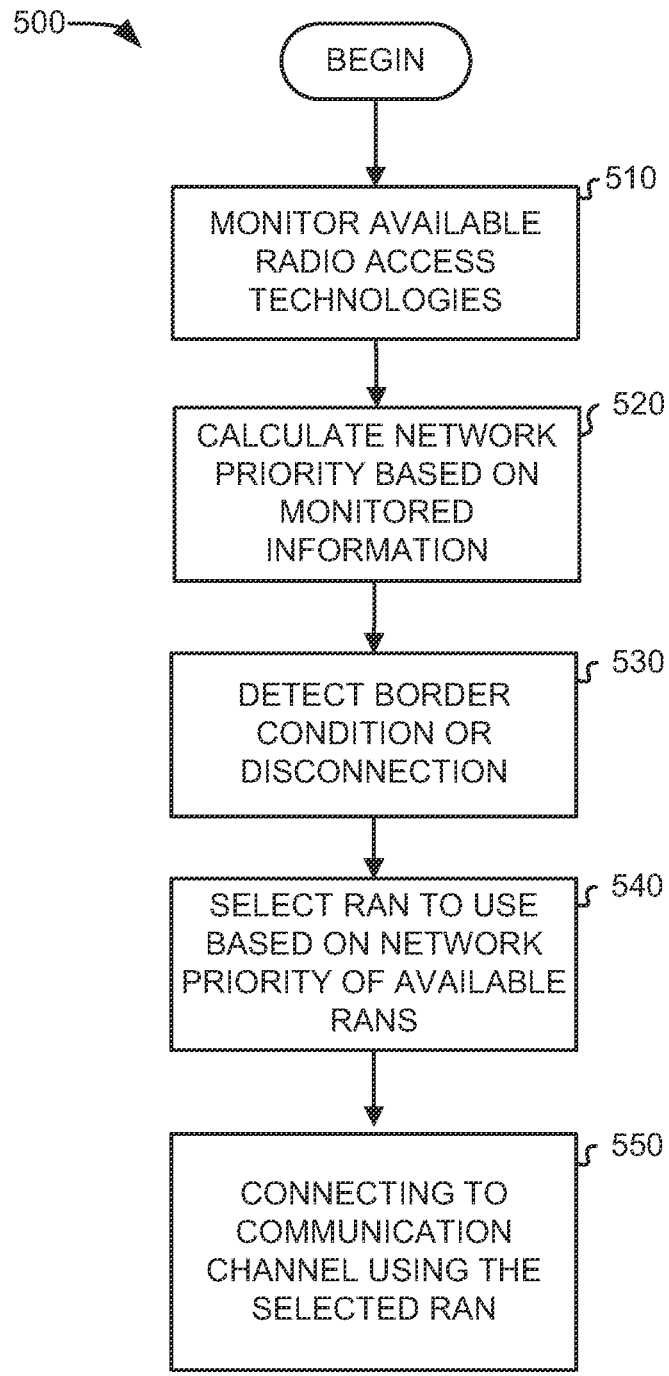
FIG. 5 is a flow chart of an example process according to an implementation described herein.

FIG. 5 is a flow chart illustrating an example process 500 for connecting mobile device 110 to a particular RAN 120. Process 500 may be performed, for example, by mobile device 110. In other implementations, some or all of process 500 may be performed by other devices that can assist in connecting mobile device 110 to a particular RAN 120, such as an external network prioritizing device.

Process 500 may include monitoring RANs 120 that are available to mobile device 110 (block 510). Mobile device 110 may, for example, monitor RANs 120 to determine the RAT types for RANs 120, the quality assessment values, the signal strength values, and/or the carrier identifiers associated with the available RANs 120. The monitored information may be maintained in a data structure, such as data structure 400.

Process 500 may further include calculating the network priority for the available RANs 120 based on monitored information (block 520). In one implementation, mobile device 110 can use the monitored information to calculate priority identifiers to use for the network priorities of the available RANs 120.

The priority identifier can be determined by one or more monitored information types, including the RAT type of RAN 120 in RAN field 410, the quality assessment value in quality assessment field 420, the signal strength value in signal strength field 430, and the carrier identifier value in carrier information field 440.

In one implementation, the priority identifier can be determined based on the RAT types of RAN 120. For example, the priority identifier can have a higher value for the same RAT type as the previous RAT type that mobile device 110 was connected (e.g., the priority identifier can have a higher value for LTE if mobile device 110 is currently connected to an LTE network). Additionally, or alternatively, the priority identifier can have a higher value based on a preset priority for RAT types. For example, the priority identifier can be set to prioritize certain RAT types over others, such as, for example, LTE technology over HRPD technology, GSM technology, and WiFi technology, or WiFi technology over HRPD technology, and GSM technology, but below LTE technology.

Additionally, or alternatively, the priority identifier can be determined by the quality assessment values. For example, if a particular RAN 120 has a higher signal-to-noise ratio than other available RANs 120, then that particular RAN 120 can have the highest quality assessment value.

Quality assessment values can be based, for example, on signal-to-noise ratios (SNR), Receive Strength Signal Indicator (RSSI), Reference Signal Received Power (RSRP), Reference Signal Received Quality (RSRQ), Ec/Io (pilot channel power to total power), Received Signal Code Power (RSCP), and/or Ec/No (received energy per chip divided by the power density in the band or RSCP/RSSI). In one implementation, LTE network 130 can have quality assessment values calculated based on RSSI, RSRP, and/or RSRQ. Additionally, or alternatively, CDMA networks can have quality assessment values calculated based on RSSI and/or Ec/Io. Additionally, or alternatively, UMTS networks can have quality assessment values calculated based on RSCP, RSSI, and/or Ec/No. Additionally, or alternatively, GSM networks 150 can have quality assessment values calculated based on RSCP, RSSI and/or Ec/No.

Additionally, or alternatively, the priority identifier can be determined by the signal strength values. For example, if a particular RAN 120 has a higher signal strength than the other available RANs 120, then that particular RAN 120 can have the highest signal strength value.

Additionally, or alternatively, the priority identifier can be determined by the carrier identifier. For example, if a particular RAN 120 is the only RAN 120 on the same carrier as the carrier for mobile device 110, then that particular RAN 120 can have the highest carrier identifier.

Additionally, or alternatively, the priority identifier can be based on calculating a value based on two or more fields of data structure 400, then ranking the available RANs 120 based on the calculated value. In one implementation, the priority identifier can be determined by comparing calculations based on using weighting values with two or more of: the RAT type of RAN 120 in RAN field 410, the quality assessment value in quality assessment field 420, the signal strength value in signal strength field 430, or the particular carrier identifier in carrier information field 440.

The priority identifier can be based on comparing calculated values using weighting values along with integer values for two or more of: the RAT type of RAN 120, the quality assessment value, the signal strength value, or the particular carrier identifier. For example, the priority identifier can be based on comparing values calculated using a weighting value of 0.7 for the quality assessment value and a weighting value of 0.3 for the signal strength value for particular RANs 120. In this case, a first RAN 120 can have a calculated value of 2.7 based on a quality assessment value of 3 and the signal strength value of 2 (0.7*3+0.3*2=2.7), and a second RAN 120 can have a calculated value of 2.3 based on a quality assignment identifier of 2 and a signal strength value of 3 (0.7*2+0.3*3=2.3). The priority identifier for the first RAN 120 would have a higher priority identifier and thus a higher network priority in network priority field 450 than the second RAN 120 based on the calculated values.

Alternatively, or additionally, the priority identifier can be determined by a multi-step priority determination. In one implementation, the RAT type of RANs 120 and the carrier identifiers can set a tentative priority that can be adjusted by the quality assessment value and signal strength value for the priority identifier. For example, if mobile device 110 is connected to a first LTE network 130 with a carrier identifier of 3, priority can be given to continuing on another LTE network 130 with a carrier identifier of 3. If there is more than one available LTE network 130 with a carrier identifier of 3, then the quality assessment value and signal strength value can determine the priority identifier among the available LTE networks. Additionally, if there are no other LTE networks with carrier identifier of 3, then the RAT type of RAN 120, the quality assessment value, the signal strength value, the carrier identifier, or any combination thereof, can determine the priority identifier.

Process 500 may include detecting a border condition or a disconnection from the connected RAN 120 (block 530). In one implementation, mobile device 110 may detect a border condition or a disconnection if there is a decrease in signal strength and/or signal quality between mobile device 110 and the connected RAN 120. Additionally, or alternatively, mobile device 110 can experience a border condition if the quality assessment value or the signal strength value for the connected RAN 120 decreases below a predetermined threshold that can be stored in memory 330 of mobile device 110. Mobile device may experience a border condition or disconnection from the connected RAN due to mobile device 110 movement, signal degradation from a transmitter, interference, etc.

Process 500 may also include selecting a particular RAN 120 to use based on the network priorities of the available RANs 120 (block 540). In one implementation, mobile device 110 can access a data structure, such as data structure 400, and can select an available RAN 120 with the highest priority identifier without having to scan for available RANs 120 after a border condition or disconnection occurs. By accessing data structure 400 with priority identifiers, mobile device 110 can connect to an available RAN 120 without any delays that may be associated with scanning for available RANs 120 prior to connecting mobile device 110 to an available RAN 120.

Process 500 may include connecting to a communication channel using the selected RAN 120 (block 550). In one implementation, mobile device 110 can connect to a communication channel using the selected RAN 120 and mobile device 110 can route communications through the communication channel provided by the selected RAN 120.

Figure 6:
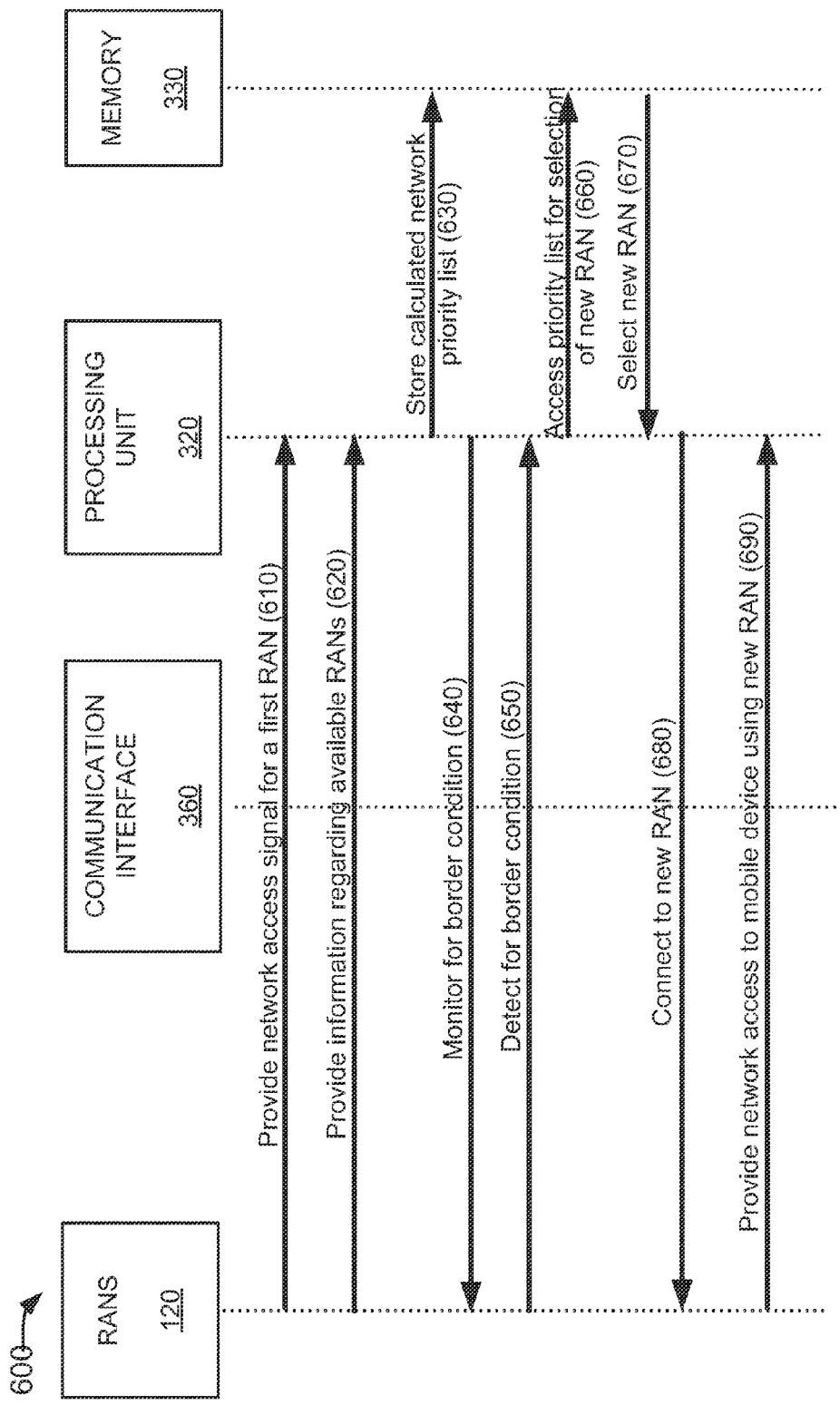
FIG. 6 is a signaling diagram of an example process between components of FIGS. 2 and 3 according to an implementation described herein.

FIG. 6 is a signaling diagram 600 of an example process according to an implementation described herein. As illustrated in signaling diagram 600 may include RANs 120, communication interface 360 of mobile device 110, processing unit 320 of mobile device 110, and memory 330 of mobile device 110.

As further shown in FIG. 6, RANs 120 can provide network access to processing unit 320 through communication interface 360 of mobile device 110 through a first RAN 120 via signal 610.

RANs 120 can also provide information regarding available RANs 120 that processing unit 320 can monitor via signal 620. Processing unit 320 may monitor RAT types, signal quality, signal strength, and/or carrier information from the information provided by RANs 120 via signal 620.

Based on monitoring by the processing unit 320, processing unit 320 may calculate a network priority list and send the network priority list to memory 330 for storage via signal 630. Processing unit 320 may calculate the network priority list based on the monitored information from signal 620.

Processing unit 320 can monitor RANs 120 for border conditions through communication interface 360 via signal 640. Processing unit 320 may monitor the same information provided via signal 620 and/or additional or alternative information via signal 640.

RANs 120 may provide information that processing unit 320 determines indicates a border condition via signal 650. The information from signal 650 may be the same or similar information to information provided via signals 620 and 640.

Processing unit 320 can determine that a border condition is occurring or has occurred and can access the stored network priority list in order to select a new RAN via signal 660 to memory 330.

Memory 330 can provide the stored network priority list or a particular selection of one or more available RANs from the stored network priority list and processing unit 320 can select a new RAN via signal 670.

Processing unit 320 can connect to the new RAN 120 via signal 680 without processing unit 320 having to calculate a priority list after detecting a border condition.

The new RAN 120 from RANs 120 can provide network access to processing unit 320 via communication interface 360 via signal 690.

Systems and/or methods are provided herein that allow mobile device 110 to select and connect to a particular available RAN 120 from a group of available RANs 120 using information that can be gathered prior to mobile device 110 experiencing a border condition or a disconnection. Mobile device 110 can monitor available RANs 120 for information about the available RANs that can allow mobile device 110 to set a network priority. Mobile device 110 can use the network priority to select the particular available RAN 120 if a border condition or disconnection occurs without having to scan and prioritize available RANs 120 when the border condition or disconnection occurs.

The foregoing description provides illustration and description, but is not intended to be exhaustive or to limit the implementations to the precise form disclosed. Modifications and variations are possible in light of the above disclosure or may be acquired from practice of the implementations.

While a series of blocks has been described with regard to FIG. 5, the order of the blocks may be modified in other implementations. Further, non-dependent blocks may be performed in parallel.

It will be apparent that systems or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor and executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims or disclosed in the specification, these combinations are not intended to limit the disclosure of the embodiments. In fact, many of these features may be combined in ways not specifically recited in the claims or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   monitoring, by a mobile device, available radio access networks for information on types of radio access technologies of the available radio access networks and one or more of measurements of signal quality of the available radio access networks, measurements of signal strengths of the available radio access networks, or carrier identifiers of the available radio access networks;
   calculating, by the mobile device, network priorities for the available radio access networks based on the types of radio access technologies,
     the network priorities including a first network priority and a second network priority,
     the first network priority being calculated for a first network, of the available radio access networks, that is associated with a first type of the types of radio access technologies,
     the second network priority being calculated for a second network, of the available radio access networks, that is associated with a second type of the types of radio access technologies, and
     the first network priority having a higher priority than the second network priority based on the first type matching a type of radio access technology of a radio access network to which the mobile device is currently connected;
   detecting, by the mobile device, a border condition due to movement of the mobile device based on a decrease in the measurements of signal quality or the measurements of signal strengths;
   selecting, by the mobile device and after detecting the border condition, an available radio access network from the available radio access networks based on the calculated network priorities of the available radio access networks; and connecting, by the mobile device, to a communication channel using the selected available radio access network.

2. The method of claim 1, where monitoring the available radio access networks for information includes monitoring the available radio access networks for information on the types of radio access technologies, the measurements of signal quality, and the measurements of signal strengths.

3. The method of claim 1, where calculating the network priorities is further based on the measurements of signal quality.

4. The method of claim 1, where calculating the network priorities is further based on the measurements of signal strengths.

5. The method of claim 1, where calculating the network priorities comprises:
   calculating temporary priorities for the available radio access networks based on
   the types of the radio access technologies, and
   calculating the network priorities based on the temporary priorities, the measurements of signal quality, and the measurements of signal strengths.

6. The method of claim 1,
   where monitoring the available radio access networks for information includes:
      monitoring the available radio access networks for information on the types of radio access technologies, the measurements of signal quality, the measurements of signal strengths, and the carrier identifiers, and
   where calculating the network priorities of the available radio access networks is further based on the measurements of signal quality, the measurements of signal strengths, and the carrier identifiers.

7. The method of claim 1, where the types of radio access technologies of the available radio access networks include Long Term Evolution (LTE) technology, High Rate Packet Data (HRPD) technology, Global System for Mobile Communications (GSM) technology, or Wireless Fidelity (WiFi) access technology.

8. A device comprising:
   a communication interface; and
   a processor; and
   a memory to store programming instructions that, when executed by the processor, cause the processor to:
      monitor available radio access networks for information on types of radio access technologies of the available radio access networks and one or more of measurements of signal quality, measurements of signal strengths, or carrier identifiers;
      calculate network priorities for the available radio access networks based on the types of radio access technologies,
         the network priorities including a first network priority and a second network priority,
         the first network priority being calculated for a first network, of the available radio access networks, that is associated with a first type of the types of radio access technologies,
         the second network priority being calculated for a second network, of the available radio access networks, that is associated with a second type of the types of radio access technologies, and
         the first network priority having a higher priority than the second network priority based on the first type matching a type of radio access technology of a radio access network to which the mobile device is currently connected;
      detect a border condition due to movement of the mobile device;
      select a radio access network from the available radio access networks, to replace the radio access network to which the device is currently connected, based on the calculated network priorities, and
      connecting, through the communication interface, a communication channel using the selected radio access network.

9. The device of claim 8, where, when monitoring the available radio access networks for the information, the processor is to:
   monitor the types of radio access technologies for the available radio access networks;
   monitor the signal quality of the available radio access networks; and
   monitor the signal strengths of the available radio access networks.

10. The device of claim 8, where, when calculating the network priorities, the processor is to:
   calculate the network priorities based on the types of radio access technologies and the measurements of signal quality.

11. The device of claim 8, where, when calculating the network priorities, the processor is to:
   calculate the network priorities based on the types of radio access technologies and by measuring and comparing one or more of a signal-to-noise ratios (SNR), a Receive Strength Signal Indicator (RSSI), a Reference Signal Received Power (RSRP), a Reference Signal Received Quality (RSRQ), an Ec/Io (pilot channel power to total power), a Received Signal Code Power (RSCP), or an Ec/No (received energy per chip divided by the power density in the band or RSCP/RSSI).

12. The device of claim 8, where, when calculating the network priorities, the processor is to:
   calculate the network priorities for the available radio access networks based on the types of radio access technologies, the measurements of signal quality, the measurements of signal strengths, and the carrier identifiers.

13. The device of claim 8, where, when calculating the network priorities, the processor is to:
   calculate temporary priorities based on the types of radio access technologies, and
   calculate the network priorities based on the temporary priorities and the measurements of signal strengths.

14. A non-transitory computer-readable medium storing instructions, the instructions comprising:
   one or more instructions that, when executed by a mobile device, cause the mobile device to:
      determine types of radio access technologies of available radio access networks;
      determine network priorities for the available radio access networks based on the types of radio access technologies,
         the network priorities including a first network priority and a second network priority,
         the first network priority being determined for a first network, of the available radio access networks, that is associated with a first type of the types of radio access technologies,
         the second network priority being determined for a second network, of the available radio access networks, that is associated with a second type of the types of radio access technologies, and the first network priority having a higher priority than the second network priority based on the first type matching a type of radio access technology of a radio access network to which the mobile device is connected;

create a prioritized list of the available radio access networks based on the network priorities;

detect a border condition due to movement of the mobile device;

select, after detecting the border condition, a particular radio access network, of the available radio access networks, based on the prioritized list of the available radio access networks; and connect to the particular radio access network.

15. The non-transitory computer-readable medium of claim 14, where the instructions further comprise:

one or more instructions that, when executed by the mobile device, cause the mobile device to:

monitor measurements of signal quality of the radio access network to which the mobile device is connected, and monitor measurements of signal strength of the radio access network to which the mobile device is connected, and where the one or more instructions to detect the border condition comprise:

one or more instructions that, when executed by the mobile device, cause the mobile device to:

detect the border condition due to movement of the mobile device when:

the monitored measurements of signal quality are below a first predetermined threshold, or the monitored measurements of signal strength are below a second predetermined threshold.

16. The non-transitory computer-readable medium of claim 14, where the instructions further comprise:

one or more instructions that, when executed by the mobile device, cause the mobile device to:

monitor measurements of signal quality of the available radio access networks, and where the one or more instructions to determine the network priorities comprise:

one or more instructions that, when executed by the mobile device, cause the mobile device to:

determine the network priorities based on the types of the radio access technologies and the measurements of signal quality.

17. The non-transitory computer-readable medium of claim 14, where the instructions further comprise:

one or more instructions that, when executed by the mobile device, cause the mobile device to:

monitor measurements of signal strength of the available radio access networks, and where the one or more instructions to determine the network priorities comprise:

one or more instructions that, when executed by the mobile device, cause the mobile device to:

determine temporary priorities based on the types of radio access technologies, and determine the network priorities based on the temporary priorities and the measurements of signal strength of the available radio access networks.

18. The non-transitory computer-readable medium of claim 14, where the available radio access networks include Long Term Evolution (LTE) networks, High Rate Packet Data (HRPD) networks, Global System for Mobile Communications (GSM) networks, or Wireless Fidelity (WiFi) networks.

19. The non-transitory computer-readable medium of claim 14, where the one or more instructions to determine the network priorities comprise:

one or more instructions that, when executed by the mobile device, cause the mobile device to:

calculate the network priorities based on the types of radio access technologies and carrier identifiers of the available radio access networks.

20. The non-transitory computer-readable medium of claim 14, where the one or more instructions to detect the border condition comprise:

one or more instructions that, when executed by the mobile device, cause the mobile device to:

detect the border condition due to movement of the mobile device based on measurements of signal strength or measurements of signal quality.

* * * * *